Fig. 1.

UNITED STATES PATENT OFFICE.

JOSEPH MOSES WARD KITCHEN, OF EAST ORANGE, NEW JERSEY.

HEATING AND POWER PLANT.

1,009,320.  Specification of Letters Patent.  Patented Nov. 21, 1911.

Application filed December 4, 1908. Serial No. 465,966.

*To all whom it may concern:*

Be it known that I, JOSEPH MOSES WARD KITCHEN, a citizen of the United States, residing in the city of East Orange, county of Essex, State of New Jersey, have invented new and useful Improvements in Heating and Power Plants, of which the following is a specification.

The objects of my invention are to secure economy in producing and distributing heat and power; to prevent smoke in cities; to overcome the inconveniences, discomfort and unhealthfulness of burning crude coal fuel; to prevent heat wastes; to decrease the dangers from explosion in power generation; to secure utilitarian advantages in the management of heating and power plants; and to secure functional efficiency through the coactive use of a number of structural improvements in combined fuel gas, electrical and heat generating plants.

In carrying out the objects of the invention I generate a low cost fuel gas in one or more internally fired gas generators from the cheapest grades of fuels, utilizing both the suction method, and sometimes the pressure method of gas production, or using one or both methods at once.

It should be understood that in making my claims for the present invention, and when I refer to a gas generator or a producer gas generator, I do not confine myself to a structure only capable of producing what is ordinarily known as carbon monoxid gas. There are conditions in which it is desirable to generate and distribute a gas that is richer in heating qualities than such gas. In such instances I provide means for making a gas of initial low cost, but having a large percentage of water gas or other heat forming constituents; but I differentiate the gas I use from gas generated in an externally fired retort. I burn some of the gas in an internal combustion engine designed to secure a relatively perfect combustion of the gas and thus secure motive force for motive work and heat for heating. I use the heat in the exhaust gases of the internal combustion engine for the higher heating of preheated jacket or other water, producing hot water for heating purposes and generating steam under low pressure from the waste heat, and sometimes I superheat the steam, and turn the expansive force of the steam generated into motive power. I unite through mechanical means, and apply in effective motive work, the power developed in the internal combustion engine and the power secured from the expansive force of the steam, without loss of efficiency due to unfavorable rates of motion in either of the two sources of motive force. I heat water for heating purposes with the latent heat of steam that has become expanded in developing motive energy, and I also heat water with other low degrees of heat developed in the plant. I secure indirectly through a vacuum exhaust, motive power by condensing the exhaust steam of a steam motor, and then use regeneratively the heat absorbed in the condensing process to heat air for respiration or for combustion. I provide for the use of the heat generated during the period of blowing the gas producer that is preliminary to the production of a combustible gas; and through composite use of gas power and steam power, I provide for the utilization of the surplus gas generated and the excess of kinetic energy generated in the gas engine that is not utilized in work. I create fuel gas in the system at a very low cost, generate an electric current, and distribute both the fuel gas and the electric current for purposes of useful work, and also distribute more or less of the heat for heating purposes, either in hot water, in steam, or in warm vapor. With the motive power developed in the plant, I produce and distribute electric energy, and secure through mechanical action the forced circulation and distribution of the fuel gas and hot water or other heat conveying means.

The novel structural features of the invention necessarily comprised in an installation such as is herein illustrated and described are valuable in carrying out in an improved manner the various objects of the invention, being especially applicable in facilitating the working of plants comprising the invention, in large individual installations, or in central plants for district heating and power generation and for the distribution of the electric current.

The drawings herewith submitted are largely diagrammatic in character, representing the application of the cited principles in a general way.

The gas generator G (see Fig. 1) is of a type suited to the nature of the fuel used, and generates so-called producer gas varying in quality according to the uses to which the gas is to be applied. Draft through the generator is induced by the gas exhauster and blower $G^2$ and the engine E, and the gas is forced by the action of the fan $A^2$ to the several places in which it is used. Air for combustion heated by the heat radiated from the several ordinary structural features of the plant and from special heat radiating features, is intercepted and collected at a level considerably higher than the zone occupied by the attendants of the plant, the arrangement of the radiating parts providing for the progressive heating of the air by elements radiating progressively higher degrees of heat. The air is drawn through the air duct A, gaining entrance thereto through the damper controlled air entrances $A^3$. Air is drawn into the engine through the duct $A^1$. Air for combustion is also heated by hot water being passed through the devices I and $I^1$ (Fig. 2), and is conveyed through the duct $A^4$ to the duct A. Most of the radiated heat is used in heated air for combustion in an accessory furnace for generating the high heat needed to produce such high pressure steam as would be used in the system. The features herein prominently indicated specially pertain to the conservation of the waste heat of gas generation and burning that is of low intensity as to temperature and which is usually entirely lost in practice.

Figure 1:
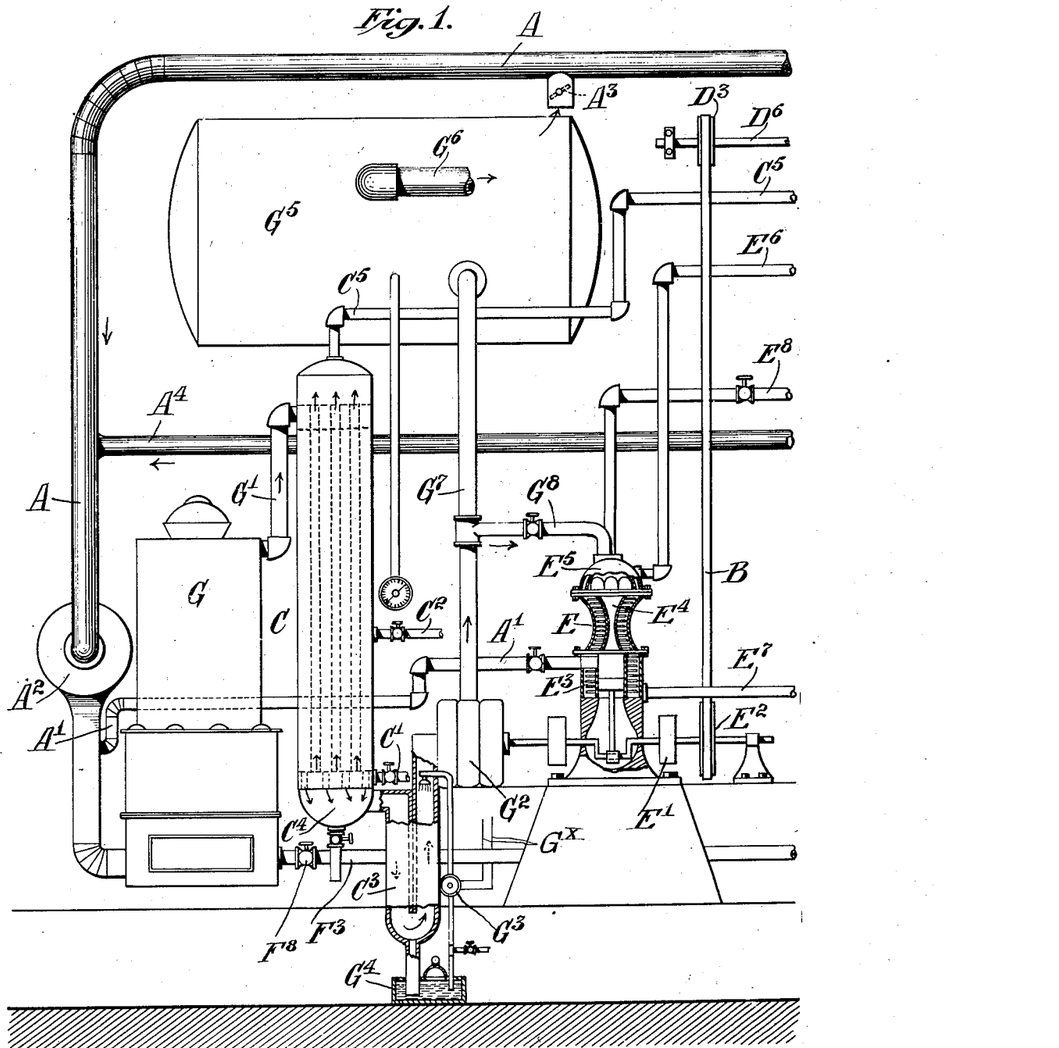
Figure 1 represents the left hand part of a system comprising the invention, parts being in elevation, and parts in section.

The combustion in the gas generator, and the nature of the gas produced, may be modified by the introduction under the grate of exhaust waste gases through the duct $F^3$ if a monoxid gas is desired, and by the water vapor conveyed by the air, or in the form of steam if a hydrogenated gas is desired. In order to secure a combustible gas of uniform quality I provide for a uniform rate of combustion in the gas generator by the use of a means auxiliary to the suction force of the gas engine, which is later referred to.

*The gas cooler and cleaner.*—The gas is conveyed from the gas generator G through the duct $G^1$ into the gas cooler, water heater, and steam generator C, passing downwardly therethrough to the dust intercepter $C^3$. Cold water is forced upwardly through the cooler C from the pipe $C^1$. As desired, more or less of this water, which may be refrigerated if desired, can be carried out of the cooler C by the pipe $C^2$, and thence can be conveyed to the water cooler and air heater $I^1$ in case tar needs to be condensed from the gas by a large introduction of cold water into the gas cooler, the tar falling into the tar receptacle $C^4$. The water is progressively heated in its passage upwardly through the gas cooler by the sensible heat of the gas. If the gas is of high temperature more or less of the water is changed into steam, which is then conveyed out of the top of the device by the steam pipe $C^5$ to the turbine D.

The dust intercepter $C^3$ indicates a means for securing a deposition of the dust that is in the gas by the downward momentum of the dust and by spraying the dust with water forced through the device by the electric rotary pump $G^3$ which receives motive energy from the conduits $G^x$. The dust and water gravitates into the mud box $G^4$. An ordinary vertical scrubber can take the place of this device. It will be noted that tarry vapors are removed from the gas before the gas is washed to remove dust and sulfur vapors.

The gas pump $G^2$ actuated by the engine E, or other motion generator draws gas from the gas generator G and forces it through the pipe $G^7$ into the pressure accumulator gas tank $G^5$, and to the engine E by the branch pipe $G^8$. This gas pump would be of any known type for exhausting and forcing gas and for maintaining automatically by means of the by-pass that is usually provided, a regulated forced pressure. The gas is forced from the compression tank $G^5$ through the distributing main $G^6$ to such points of distribution as is needed in using the gas, the distributing system not being shown in the drawings for clearness. In most cases it is best to have this gas pump motored by some device separate and apart from the prime mover of the system.

The internal combustion engine E, having the fly wheel $E^1$, may be of any suitable type. The jacket water for the engine would be taken from a level in the boiler F where the temperature of the water would be suitable. The heat of the jacket water may be economized in connection with a water heating system, or in a low pressure steam system if accessory heating of the water is done with the exhaust gases from the engine and by burning solid fuel. In some cases the heat of the jacket water is best conserved by cooling the jacket water and transferring the heat of cooling to air for combustion.

*The heating system.*—As a heat economizing procedure, or as a convenience, a heating system may be included in a plant comprising the invention. The heat conveying medium used in the system may be steam under pressure, or vapor induced in its flow by a vacuum; but whenever practicable I prefer to use hot water, as in this case it is possible to utilize substantially all the low degrees of heat generated in the plant. If the application of the invention is restricted to an ordinary building, the use of the exhaust steam from the plant would ordinarily be used in heating; but in the district heating of moderate areas the distribution of hot water under considerable pressure would be best. In the district heating of large areas, the use of a distributed fuel gas is best. The plant is so arranged that when heat for heating is not needed, most of the heat generated can be utilized in creating motive force. As fuel gas is distributed from the plant, which can be utilized in local habitations in the heating of water for domestic use, it is obvious that no heat needs to be distributed in hot water or steam in the heating system during the milder seasons of the year.

Figure 2:
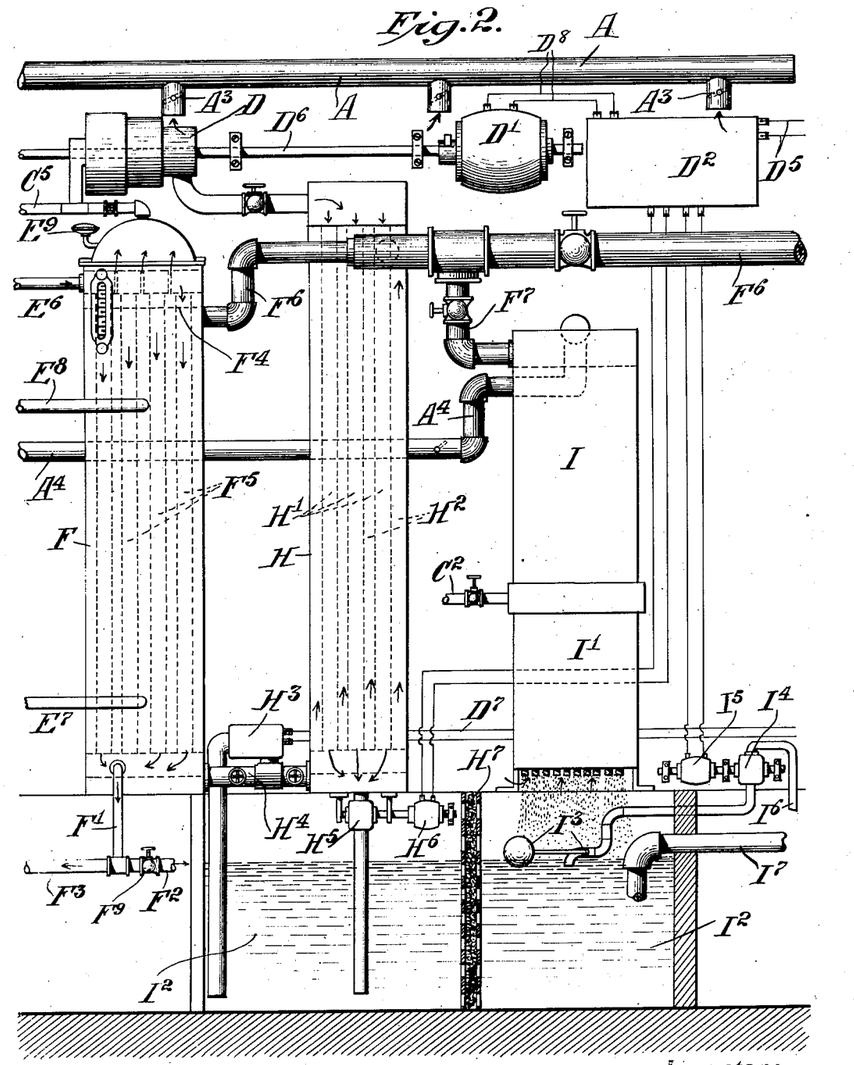
Fig. 2 represents the middle part of the same system, it being shown in elevation, and partly in section.

The economizer boiler F is designed to highly heat water and produce steam under moderate pressure. E⁹ is a pressure relief valve. Water is pumped by the electric engine H³ from the well I² into a low level of the economizer boiler F, and thence upward and out through the water main F⁶. Water from a selected level of this boiler is passed through the pipe E⁷ into the jacket of the engine, and is reintroduced at a higher level in the boiler through the pipe E⁸. Exhaust gases are conveyed from the engine through the conduit E⁶ into the boiler F at its top, passing downward through the tubes F⁵, and out through the exhaust pipe F¹, part of the gases when desired being conveyed under the gas generator G through the conduit F³ controlled by the valve F⁸, and the balance being forced into the atmosphere through the conduit F²,' controlled by the valve F⁹. The water being forced through this economizer boiler F is progressively heated in its ascent upward, some of it being formed into steam at the upper levels, while the steam above the water level F⁴ is superheated by the highest heat of the exhaust gases from the engine. The steam generated in the boiler F may be superheated by keeping the water level in the boiler at a sufficiently low level. If the gas used is very hot and contains sulfur vapors, the heating surfaces of the boiler should be kept submerged in water. In such instances, the superheating would be done in a separate superheater using fuel of more concentrated heating power. All the heat absorbed in this boiler many be conveyed and distributed in the related heating system, or the heat may be turned into steam for power generation. The water level is preferably kept at the same height in all the water containing elements. The exhaust gases are passed through this boiler under an unexpanded pressure that is equal to the pressure of the gases in the engine cylinder at the end of its pressure stroke in order to avoid loss of sensible heat due to expansion of the gas. In certain cases the jacket water is cooled in a separate cooling device, and the feed water for the jacket is taken from the separate cooling device. By varying the pressure of the exhaust gases as they pass through the water heater more or less of the kinetic energy of the gas engine can be transferred to steam under pressure, and thus it is possible to conserve the surplus kinetic energy of the engine for use for heating purposes.

The steam turbine D is of a size and character suitable for utilizing with efficiency the steam generated from the economizer boiler F, and also from the gas cooler C if steam is formed in that device. The turbine works with a vacuum exhaust created in the condenser H during the periods when the exhaust steam from the engine would not be used in heating. The turbine D actuates the shaft D⁶, having the pulley D³, which is belted differentially with the pulley E² that is actuated by the shaft of the engine E.

*Unifying the motive forces.*—Particular note must be made of my methods of joining the motive power generated separately by the internal combustion engine and by the steam turbine, or other steam motor if used, to secure substantially complete efficiency of action in both the engine and the steam motored element. The union of motive energies separately engendered is so effected as not to interfere with the rate of rotation in the shafts of engine and turbine that is necessary to secure the most efficient work in each of them. In this particular case I secure the effect sought for through the use of belting and pulleys so differentiated as to size as to secure synchronously the desired rate of revolution in each shaft. In Patent #883,809, and in application Serial No. 453,275, filed Sept. 16, 1908, I show other methods of accomplishing the same result.

It should be understood that it is only in the composite generation of both steam and gas power that the greatest fuel economy and utilitarian advantages can be secured, each method of power generating having advantages which make good the defects in the other method. The rates of revolution of the shaft of the internal combustion engine E and of the shaft $D^6$ are properly arranged for by differential pulleys $E^2$ and $D^3$, they being joined by the belt B.

Figures 6, 7:
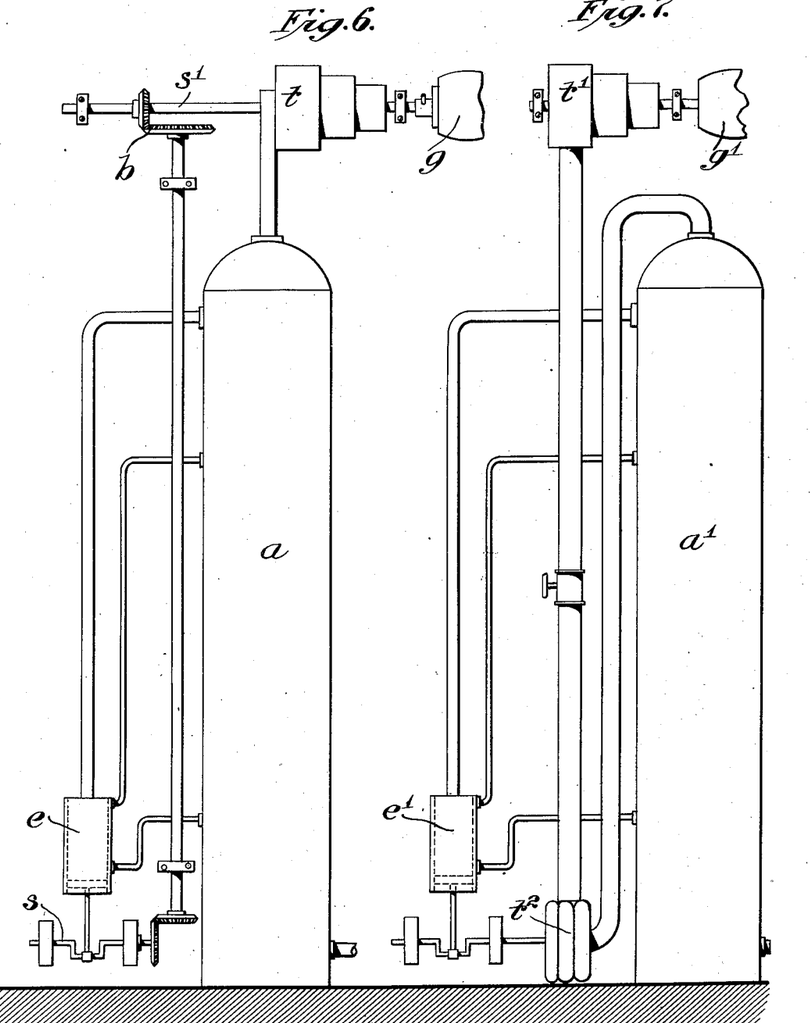
Fig. 6 represents a modification of the means used in the invention for unifying the two sources of kinetic energy into one harmonious and economically produced outflow of kinetic energy.
Fig. 7 represents another modified structure for uniting two sources of kinetic energy.

In Fig. 6 a diagrammatic presentation is made of how the two forces of explosion and of steam expansion may be united to advantage in some cases by means of differential bevel gearing. $a$ represents a steam economizer boiler in which the jacket water heat and exhaust gases exhausted under pressure from an internal combustion engine $e$ are utilized to generate steam. The steam is used expansively in the turbine $t$ while the rotation of the shafts $s$ and $s^1$ are maintained severally at efficient rates of speed by means of the differential gearing $b$, the two forces being applied unitedly in rotating an electric generator $g$.

In Fig. 7 there is indicated another method of unifying the two forces into one outflow of energy in rotating the electric generator $g^1$. The waste heat from the internal combustion engine $e^1$ is turned into steam in the economizer boiler $a^1$, from which boiler the steam is conveyed through the turbine $t^2$. In this turbine $t^2$ the energy of the engine $e^1$ is added to the energy of the steam generated in the boiler $a^1$, and the steam velocity which is accelerated by the action of the turbine $t^2$ is then conveyed into a prime mover turbine $t^1$ of suitable size and construction to secure the best rate of revolution of the electric generator $g^1$.

The electric generator $D^1$ connected with the shaft $D^6$, is of a size and nature to develop the greatest amount of electric energy from the force generated in the turbine D and the engine E. The electric energy generated by this generator $D^1$ is directed through the conduits $D^8$ into and accumulated in the accumulating battery $D^2$, from which electric energy is conveyed through the conductor wires $D^5$ and $D^7$ for various kinds of work to several parts of the plant, as for example to the electric pump $H^3$; and is also distributed to various other places where it is applied in work, including the dwelling M (see Fig. 3). Two other sources of electric energy are utilized in the plant. One is generated by the generator $I^5$ actuated by the water motor $I^4$, which gets its force through the city water main $I^6$. The motor $I^4$ operates when the automatic valve $I^3$ opens, which occurs when the water needed in the system is not kept up to a certain level in the well $I^2$. The water returning from the heat distributing system to the well $I^2$ through the return main $I^7$ is filtered in passing through the filter $H^7$ before it is again forced into the system through the piping $H^4$ by the electric pump $H^3$. While some of the individual savings thus effected are small in degree, their aggregate is of importance.

The water heater and condenser H receives the exhaust steam from the turbine D if the steam is not utilized directly in heating. The steam in expanding is conveyed downwardly through the tubes $H^1$, while the more or less cooled water in the well $I^2$ is forced by the pump $H^3$ upwardly through the water spaces $H^2$. The steam is condensed by the cold water in the upward travel of the water, producing a vacuum exhaust for the turbine D. The water as it is heated in the condenser, is also forced into the flow water main $F^6$. The water of condensation gravitating downwardly into the well $I^2$ passes through the water motor $H^5$, which operates the electric generator $H^6$, and the energy thus generated is also directed into the accumulator $D^2$. When the heat of the condensing water is not wanted in the heating system, the warm water is run through the water cooler I transferring the heat in the water to air for combustion. When power generation only is evolved in the plant the heat of both the water of condensation and of the condensing water is radiated to air for combustion.

Figures 3, 4, 5:
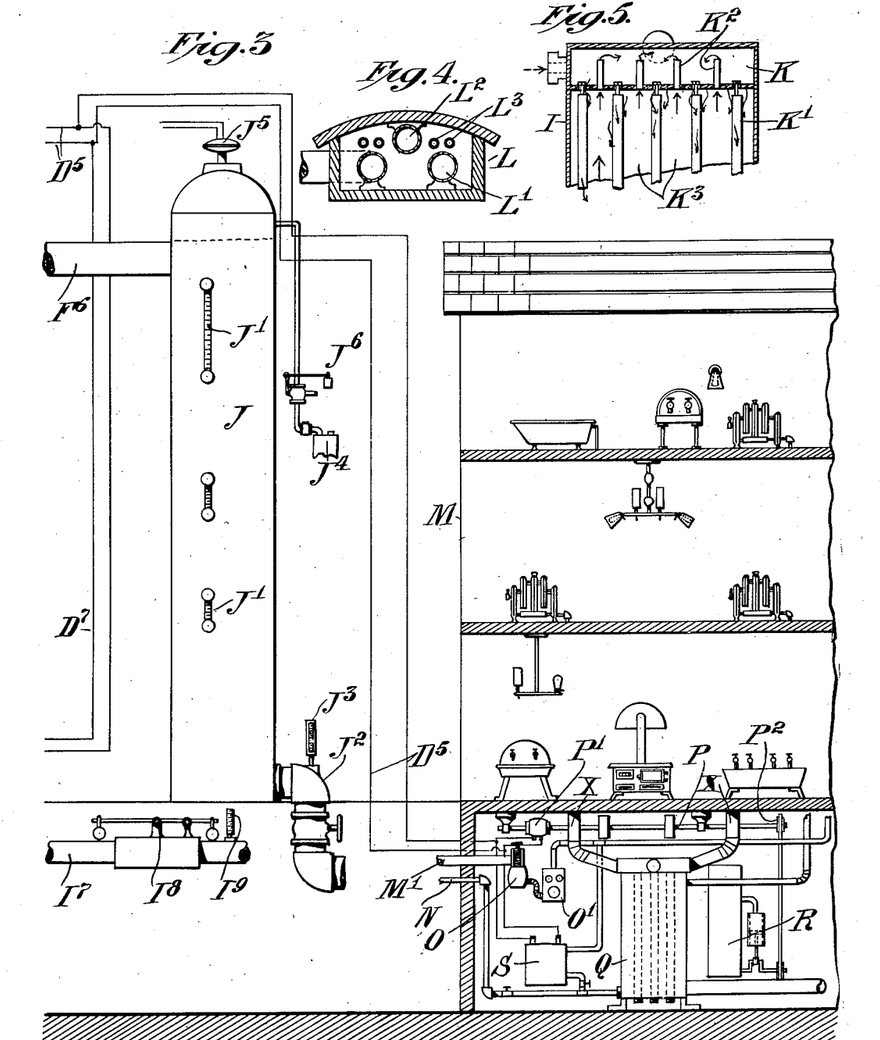
Fig. 3 represents in elevation the right hand part of the same system, including a dwelling served by distributed products from the plant, some of the parts being shown in section.
Fig. 4 represents in transverse section a tunnel containing hot water, fuel gas, and electric conduits.
Fig. 5 represents a vertical section of part of a water cooler and air heater.

The water cooler and air heater I which is superimposed upon another similar device $I^1$, and of which a part is shown in detail in Fig. 5, broadly indicates methods for transferring heat generated and absorbed into water in the system to air for combustion at such times as the heat is not needed for heating purposes. Under such conditoins, as in the summer time, water from the economizer boiler F, or directly from the engine jacket and from the condenser H, is by-passed through the conduit $F^7$ into the top K of the device I, and percolates outside or inside the tubes $K^1$, (see Fig. 5) downwardly, air for combustion being drawn upwardly through the air spaces $K^3$ and air tubes $K^2$ from which it is drawn through the conduit $A^4$ (see Fig. 2) by the action of the fan $A^2$. In the device $I^1$ air for combustion is given a primary heating in passing through the device. The water which descends from both devices falls into the well $I^2$. By means of these devices a very considerable degree of heat that is usually lost in condensing, and in other ways, can be conserved by transferring the waste heat to air for combustion. If dry air is desired under the gas producer or in an auxiliary heat generating furnace, water is allowed to flow inside of the tubes $K^1$ instead of outside of them. The applied principle of the vertical-counter-current heat interchange can also be applied in various forms of cooling towers, by simply conserving the heat of cooling that is generally allowed to escape. Under some conditions under which the utmost development of motive power is desired, it is best to radiate the heat of the jacket water to air for respiration or combustion in a device separate and apart from the device that utilizes the waste heat of the exhaust gases, as there is a certain definite temperature for the exhaust jacket water at which the gas engine works most efficiently. In these cases it is best to keep the jacket feed water under a separate control.

*The hot water pressure tank.*—The pneumatic pressure hot water tank J is for the purpose of storing and securing an equalized pressure of the hot water which is sent out from the plant and distributed in various places. A certain amount of air is pumped into the tank by the air pump $J^4$ for equalizing the pressure in the tank. The pressure indicator $J^5$ may be used to indicate electrically the pressure in the tank. The amount of air pumped into the storage tank J is sufficient to maintain an adequate internal pressure and to secure a uniform rate of distribution of the hot water, excess of air, displacing stored hot water, being relieved through the pressure air valve $J^6$. The water gage $J^1$ shows the water level in the tank J, and the thermometers $J^3$ and $I^9$ indicate the temperatures of the water which leaves the plant through the flow main $J^2$, and which returns to the plant through the return main $I^7$.

$I^8$ on the return main $I^7$ indicates a back pressure regulator of the safety valve type for preventing too rapid a return from the water distributing and radiating systems supplied from the plant.

The tunnel L (see Fig. 4) is made of hydraulic cement concrete, with a covering that is removable, and contains the water and gas distributing pipes and electric conduits $L^1$, $L^2$ and $L^3$. In practice, suitable insulating material would surround these pipes and conduits.

The pressure reducing valve O, connected with the branch main $M^1$, is of ordinary type, automatically adjusting the pressure of the water flow mains to a proper pressure in the radiating system and hot water conduits of the building in which the hot water is delivered.

The heat and water meter $O^1$ is thermo-electrically controlled, and calibrated to indicate the number of British thermal units, as well as the quantity of water passing through the meter.

The electrical current conveyed through the conduit $D^5$ is introduced into the building M and utilized in various ways, as for example: in revolving the shaft P, actuated by the electric motor $P^1$. From the pulley $P^2$, connection is made with a pump for cooling the mechanically actuated refrigerator R. Electric power introduced in the same way may be used for many domestic utilities, such as vacuum cleaning, washing, knife grinding, etc. The electric current may also be used for electric lighting, or for heating water in the electric heater S. In connection with plants of this kind, where there is a limit to the distance to which water can be advantageously conveyed through underground conduits without undue loss of heat, the electric current would be transmitted through the longer distances, and then utilized for heating water, and other work. In such plants, fuel gas of suitable composition can be distributed with advantage to great as well as to short distances, and used for cooking, mantle lighting, in local heating systems, etc. In closely built up cities, plants of this kind would usually be located on the outskirts of the city where land is cheap, and these various products of the plant would be distributed to such distances as would be most economically advantageous.

In the house M, Q represents an air heater and water cooler. The water, after passing through the heating system and through the air heater and water cooler, passes out through the return branch N, while air for respiration passes upwardly through the air heater and the conductors X into the house, being progressively heated in passing through the air heater. The water cooled in heating air is enabled to pick up lower degrees of heat from the boiler of the central plant than would otherwise be the case.

S represents an electric heater in which the water used for heating and domestic use in the dwelling can be heated. In plants of this character, a great deal of the economy effected is due to the coöperative exercise of the several services developed in the plant.

In the drawings, the various details, such as would indicate an introduction of fuel gas in the house, mechanical means for ventilation and positive air circulation, have along with other features been omitted for clearness.

It will be understood that in a system of this nature for producing primarily a gas of relatively low heating value, and where such gas is distributed for heating, cooking and lighting, the gas would usually be enriched to a certain degree by increasing its hydrogen content or by the introduction of some coal gas, or other carbureting enricher.

In this plant the force of the supplementary water brought into the plant through a city supply main would be utilized in one of numerous ways, as for example: connecting the main directly with the pump that pumps the water into the system; or by connecting the main with any of the various elements of the system into which cool water is introduced, such as in the gas cooler C, or the engine E.

Inasmuch as in internally fired gas generators a certain continuous rate of gas production must be maintained to produce good quality of gas I provide a gas accumulating provision for storing such excess of gas as is not immediately consumed by the suction gas engine.

As a rule the steam generated in the economizer boiler would not be of a pressure higher than the pressure in the water main introducing new water into the system. Inasmuch as a large amount of hot water would be drawn from the system to be used for domestic purposes, an equal amount of new water would be introduced into the plant, and instead of losing the pressure force of the water introduced, such force is utilized economically in one or another way, as in the example cited.

Subject matter is disclosed in the present application that is not herein claimed; but which is claimed more or less in each of the following named co-pending applications: Serial No. 415983 filed Feb. 14, 1908; Serial No. 453275 filed Sept. 16, 1908; Serial No. 460267 filed Oct. 30, 1908; Serial No. 482127 filed March 8, 1909; Serial No. 487694 filed April 3, 1909; Serial No. 504132 filed June 24, 1909; Serial No. 504778 filed June 28, 1909.

What I claim as new is:

1. The combination of (1) a producer gas generator, (2) a water jacketed internal combustion engine for burning the gas generated and creating motive power and heat, (3) an economizer steam boiler for utilizing the heated jacket water and the heat of the exhaust gases of said engine for generating steam under pressure, (4) means for creating motive power from the steam generated and for uniting the motive power created from the explosive force of said internal combustion engine with the motive power created from the expansive force of the steam generated, (5) means for heating water for heating purposes with the waste heat of said engine not used in generating steam, and from the latent heat of exhaust steam from said means for generating motive power from steam, and (6) means comprising a heating system for distributing heat from the sources of waste sensible heat generated in the elements of said plant, said absorbed and distributed heat comprising heat of radiation, and the heat of burned gases.

2. The combination in a heat and power plant of (1) a gas generator, (2) a gas pump for pumping the gas generated into a storage tank and to places for the use of said gas, (3) said storage tank for storing said gas, (4) an internal combustion engine for burning the gas generated, (5) an economizer boiler for heating water and producing steam from the heat generated in said plant, (6) a steam motor for utilizing the steam generated in said combination, (7) a water heater and condenser for utilizing the latent heat of the steam used in said steam motor, (8) means for uniting in work the motive power created by said engine and said steam motor, (9) means for distributing a heat conveying fluid heated by heat generated in the plant and radiating the heat from said fluid, (10) means for forcing the fluid through the radiating portion of said plant, (11) means for distributing and burning the stored gas in said plant and elsewhere, (12) means for generating an electric current with the motive power generated in said combination and for distributing the electric current, (13) means for heating air for respiration and combustion with the heat generated in said system, and (14) means for distributing and utilizing the air thus heated.

3. The combination of (1) a gas generator, (2) an internal combustion engine for burning the gas generated, (3) a heat absorbing, distributing and radiating system for economizing sensible heat generated in said combination, (4) means for generating an electric current from the motive power of said internal combustion engine, (5) means for generating an electric current from the waste heat of said internal combustion engine, and (6) means for unifying, conveying and applying in work the electric energy generated.

4. The combination of (1) means for generating a combustible gas, (2) means for accumulating and storing said gas, (3) means for distributing some of said gas and burning it under atmospheric pressure, (4) means for burning some of said gas in compressed air and generating motive power and heat, (5) means for generating steam from the heat wastes of said fourth named means, (6) means for generating motive power from the steam generated in said fifth named means, (7) means for heating a heat absorbing fluid from the latent heat of steam expanded in said sixth named means, (8) means for generating an electric current from the motive power generated, storing and distributing said current and applying said current to work, and (9) means for distributing and radiating the generated heat in said heat absorbing fluid and for returning said fluid for re-use and re-distribution.

5. The combination with a habitable structure of (1) a gas generator, (2) an internal combustion engine for burning the gas generated in said engine ,(3) means for heating water and generating steam of desired pressure with heat generated in said engine, (4) a motor for generating motive power from the steam of desired pressure, (5) a condenser for creating a vacuum exhaust for said motor, and (6) means comprising a heating system for utilizing the sensible heat generated in the burning of the gas and passing through said motor and through said condenser.

6. The combination of (1) means for generating gas, (2) means for burning said gas, (3) means comprising a heating system for heating a fluid with heat from the burning of said gas and for distributing the heat of said burning, and (4) means for transferring the heat in said fluid to air for combustion and further means for using the air heated for purposes of combustion, said means for transferring the heat in the fluid to air for combustion comprising provision for the downward flow of the fluid through said means and for the upward travel of air through said means in contact with said water, said means comprising rods or tubes over the surfaces of which water flows in its downward progress, said air absorbing progressively the heat from the descending water on the surfaces of the tubes or rods in the travel of said air upwardly.

7. The combination of (1) a gas generator, (2) an internal combustion engine having a revoluble shaft actuated thereby, (3) means including a steam motor having a revoluble shaft for producing steam from the heat wastes of said internal combustion engine and for utilizing the expansive pressure of said steam, (4) means comprising a heating system for utilizing the lower degrees of sensible heat evolved in said combination but not transformed into motive power in said combination, and (5) means for uniting the motive power generated by said internal combustion engine and said steam motor for securing motive power from the two sources of energy with substantially no loss of efficiency due to unfavorable rates of rotation in the said revoluble shafts.

8. The combination of (1) an internal combustion engine and means for supplying fuel to said engine, (2) a steam motor actuated by steam formed through the agency of the waste heat of said internal combustion engine, (3) means including a heating system for heating habitable spaces with the sensible heat evolved by said engine and said motor, and (4) means for synchronizing the rates of revolution of the shafts of said engine and said motor so as to avoid loss of efficiency in either engine or motor.

9. The combination with a habitable structure including a heating system, of (1) means for generating a combustible gas, (2) means for cooling the gas generated, condensing tar, forming steam and utilizing the formed steam for motive purposes, (3) means for cleaning the gas from tar and dust and distributing the gas for useful work, (4) means for burning said gas in compressed air and producing motive power, (5) means for heating water and forming steam under pressure from the burning of the gas, (6) means for generating motive power from said steam, (7) means for uniting the two outflows of motive power and for producing electric energy therefrom and for storing and accumulating the two sources of power and for directing and applying in work the generated electric energy in places where said electric energy may be usefully applied in work, such application being exemplified by the heating of water in a hot water system, in an electric heater, by the process of mechanical refrigeration, and by electric lighting.

10. The combination with a habitable structure, of (1) means for generating gas, (2) an internal combustion engine for burning the gas generated, (3) means for heating water, forming steam, and producing motive power from the sensible heat of the gas burned in the internal combustion engine, and (4) means including a heating system for converting the generated motive power into electric energy and for reconverting said electric energy into heat or motive force and for utilizing the heat generated by conveying and distributing said heat through said heating system and for utilizing the motive force in actuating domestic utilities such as mechanical refrigeration.

11. The combination of (1) means for generating gas, (2) means for generating motive power from said gas, (3) means for generating steam from the heat wastes of the said last named means and for producing motive power from said steam, and (4) means for utilizing for heating purposes the exhaust steam from the third named means.

12. The combination of (1) a gas generator, (2) an internal combustion engine for burning the gas generated, (3) a steam motor actuated by steam formed from heat wastes of the internal combustion engine, (4) means for transferring to water low degrees of heat generated by said elements, (5) means for applying in heating the heat transferred, and (6) means for transferring to air for combustion lower degrees of heat generated than the heat transferred to said water.

13. The combination of (1) a gas generator, (2) an internal combustion engine for burning the gas, (3) an economizer boiler for making steam from the high temperature waste heat of the internal combustion engine, (4) a steam motor for utilizing the steam, (5) a heating system for utilizing the heat of the exhaust steam from said steam motor, (6) means for conveying to air for combustion the low degrees of heat wastes from said internal combustion engine, said last named means comprising provision for conveying to air water moisture containing said heat, and (7) means for conveying the air thus moistened and heated to said gas generator for modifying combustion in said generator.

JOSEPH MOSES WARD KITCHEN.

Witnesses:
ELIZABETH B. KING,
GEO. L. WHEELOCK.